(12) United States Patent
Brown et al.

(10) Patent No.: US 9,105,023 B2
(45) Date of Patent: Aug. 11, 2015

(54) METHODS AND DEVICES FOR TRANSMITTING AND RECEIVING DATA USED TO ACTIVATE A DEVICE TO OPERATE WITH A SERVER

(75) Inventors: Michael Stephen Brown, Kitchener (CA); Kalu Onuka Kalu, Waterloo (CA); Brandon James Dehart, Campbell River (CA)

(73) Assignee: BlackBerry Limited, Waterloo, Ontario (CA)

( * ) Notice: Subject to any disclaimer, the term of this patent is extended or adjusted under 35 U.S.C. 154(b) by 162 days.

(21) Appl. No.: 12/713,217

(22) Filed: Feb. 26, 2010

(65) Prior Publication Data

US 2011/0210171 A1    Sep. 1, 2011

(51) Int. Cl.
*G06K 7/00*    (2006.01)
*G06Q 20/32*    (2012.01)
*H04L 29/06*    (2006.01)

(52) U.S. Cl.
CPC ........ *G06Q 20/3276* (2013.01); *H04L 63/0492* (2013.01); *H04L 63/083* (2013.01); *H04L 63/18* (2013.01)

(58) Field of Classification Search
USPC ........... 235/375, 382, 462.01, 462.41, 472.01
See application file for complete search history.

(56) References Cited

U.S. PATENT DOCUMENTS

| | | | |
|---|---|---|---|
| 6,012,102 A * | 1/2000 | Shachar ............................. | 710/5 |
| 6,061,064 A | 5/2000 | Reichlen | |
| 6,070,805 A | 6/2000 | Kaufman et al. | |
| 6,082,620 A | 7/2000 | Bone, Jr. | |
| 6,353,436 B1 | 3/2002 | Reichlen | |
| 6,685,093 B2 | 2/2004 | Challa et al. | |
| 6,783,071 B2 | 8/2004 | Levine et al. | |

(Continued)

FOREIGN PATENT DOCUMENTS

| | | |
|---|---|---|
| CA | 2714832 | 4/2011 |
| CA | 2732568 | 8/2011 |

(Continued)

OTHER PUBLICATIONS

Borchert, Bernd, "Fotohandy-PIN: Secure Online Passwords via Camera Mobile Phone", Dec. 30, 2008. Retrieved from the Internet: http://www-fs.informatik.uni-tuebingen.de/studdipl/Fotohandy-PIN/Info-Blaetter/Infor_E_Foto-PIN.pdf.

(Continued)

*Primary Examiner* — Matthew Mikels
(74) *Attorney, Agent, or Firm* — Integral Intellectual Property Inc.; Miriam Paton; Amy Scouten

(57) ABSTRACT

Embodiments of the systems, devices, and methods described herein generally facilitate transmission and reception of activation data for use in activating a mobile device to operate with a server. In accordance with one example embodiment, an activation barcode is received from a server by reading an image comprising the activation barcode via a computing device, wherein the image is displayed on a display associated with the computing device, and wherein the activation barcode encodes activation data comprising an activation password. The activation barcode is decoded at the mobile device to obtain the activation password, and an authentication is performed using the activation password after a device activation request is transmitted to the server, wherein the mobile device is activated to operate with the server if the authentication is successful.

20 Claims, 8 Drawing Sheets

(56) References Cited

U.S. PATENT DOCUMENTS

| | | | |
|---|---|---|---|
| 6,845,097 B2 | 1/2005 | Haller et al. | |
| 6,978,118 B2 | 12/2005 | Vesikivi et al. | |
| 7,035,630 B2 | 4/2006 | Knowles | |
| 7,103,359 B1 | 9/2006 | Heinonen et al. | |
| 7,107,010 B2 | 9/2006 | Heinonen et al. | |
| 7,306,153 B2 | 12/2007 | Chong et al. | |
| 7,389,928 B2 | 6/2008 | Lubow | |
| 7,407,107 B2 | 8/2008 | Engeström et al. | |
| 7,430,581 B2 | 9/2008 | Yach et al. | |
| 7,546,956 B2 | 6/2009 | Adams et al. | |
| 7,548,915 B2 | 6/2009 | Ramer et al. | |
| 7,742,953 B2 | 6/2010 | King et al. | |
| 7,769,345 B2 | 8/2010 | Johnson et al. | |
| 7,778,802 B2 | 8/2010 | O'Flaherty et al. | |
| 7,912,426 B2 | 3/2011 | Masera et al. | |
| 7,941,665 B2 | 5/2011 | Berkema et al. | |
| 7,969,286 B2 | 6/2011 | Adelbert | |
| 7,988,037 B2 | 8/2011 | Yach | |
| 8,171,292 B2 | 5/2012 | Brown et al. | |
| 8,214,645 B2 | 7/2012 | Brown et al. | |
| 2003/0050009 A1 | 3/2003 | Kurisko et al. | |
| 2003/0057284 A1 | 3/2003 | Challa et al. | |
| 2004/0258275 A1 | 12/2004 | Rhoads | |
| 2005/0015618 A1 | 1/2005 | Schneider et al. | |
| 2005/0059393 A1* | 3/2005 | Knowles | 455/432.3 |
| 2005/0099653 A1* | 5/2005 | Kawaoka | 358/1.15 |
| 2005/0164693 A1* | 7/2005 | Yach et al. | 455/419 |
| 2005/0248471 A1 | 11/2005 | Ryu | |
| 2005/0277405 A1 | 12/2005 | Noguchi | |
| 2006/0065712 A1 | 3/2006 | Ozaki et al. | |
| 2006/0065733 A1* | 3/2006 | Lee et al. | 235/462.01 |
| 2006/0094354 A1 | 5/2006 | Munje et al. | |
| 2006/0135064 A1* | 6/2006 | Cho et al. | 455/41.1 |
| 2006/0174121 A1 | 8/2006 | Omae et al. | |
| 2006/0178916 A1 | 8/2006 | Domin | |
| 2006/0274952 A1 | 12/2006 | Nakai | |
| 2007/0027964 A1 | 2/2007 | Herrod et al. | |
| 2007/0038516 A1 | 2/2007 | Apple et al. | |
| 2007/0101403 A1* | 5/2007 | Kubler | 726/3 |
| 2007/0123166 A1 | 5/2007 | Sheynman et al. | |
| 2007/0136202 A1 | 6/2007 | Noma et al. | |
| 2007/0192872 A1 | 8/2007 | Rhoads et al. | |
| 2008/0014984 A1* | 1/2008 | Brown et al. | 455/552.1 |
| 2008/0057868 A1 | 3/2008 | Chang | |
| 2008/0081666 A1 | 4/2008 | Masera et al. | |
| 2008/0082646 A1 | 4/2008 | Shenfield et al. | |
| 2008/0191025 A1 | 8/2008 | Harris | |
| 2008/0268776 A1 | 10/2008 | Amendola | |
| 2008/0272905 A1 | 11/2008 | Higaki et al. | |
| 2008/0305776 A1 | 12/2008 | Yach et al. | |
| 2009/0089581 A1 | 4/2009 | Bishop et al. | |
| 2009/0121012 A1* | 5/2009 | Beemer et al. | 235/379 |
| 2009/0176505 A1 | 7/2009 | Van Deventer et al. | |
| 2009/0282124 A1 | 11/2009 | Rauhala et al. | |
| 2010/0213251 A1 | 8/2010 | Hvidtfeldt | |
| 2010/0222041 A1 | 9/2010 | Dragt | |
| 2010/0259549 A1 | 10/2010 | Brown et al. | |
| 2011/0016413 A1 | 1/2011 | Kalu | |
| 2011/0081860 A1 | 4/2011 | Brown | |
| 2012/0054589 A1 | 3/2012 | Berger et al. | |
| 2014/0224890 A1 | 8/2014 | Brown et al. | |

FOREIGN PATENT DOCUMENTS

| | | |
|---|---|---|
| CN | 101180636 | 5/2008 |
| DE | 102005001723 | 7/2006 |
| EP | 1538787 | 6/2005 |
| EP | 2040228 | 3/2009 |
| EP | 2073515 | 6/2009 |
| EP | 2239686 | 10/2010 |
| EP | 2306692 | 4/2011 |
| EP | 2364043 | 7/2011 |
| FR | 2867650 | 9/2005 |
| FR | 2906667 | 4/2008 |
| WO | 9201258 | 1/1992 |
| WO | 02056536 | 7/2002 |
| WO | 2005002174 | 1/2005 |
| WO | 2008040004 | 4/2008 |

OTHER PUBLICATIONS

Research in Motion Limited, "BlackBerry Wireless Enterprise Activation", Release 4.0, Technical Overview, 2004.

McCune, Jonathan M. et al., "Seeing-Is-Believing: Using Camera Phones for Human-Verifiable Authentication", May 2005 IEEE Symposium on Security and Privacy, Retrieved from Internet: http://www.ece.cmu.edu/~jmmccune/papers/mccunej_believing.pdf.

Rahman, Sumair Ur, "Security for Rural Public Computing", A thesis presented to the University of Waterloo in fulfillment of the thesis requirement for the degree of Master of Mathematics in Computer Science, Waterloo, Ontario, Canada 2008.

Co-pending U.S. Appl. No. 12/504,907, "Method and Apparatus for Sharing Calendar Databases", filed Jul. 17, 2009.

Co-pending U.S. Appl. No. 12/572,386, "Method and Devices for Facilitating Bluetooth Pairing Using a Camera as a Barcode Scanner", filed Oct. 2, 2009.

Code Corporation, "QuickConnect Codes for Bluetooth Devices", Retrieved from Internet [Mar. 13, 2009]: http://www.codecorp.com/bdaddr.php.

LXE, "Bar Code Scanners", Retrieved from Internet [Mar. 13, 2009]: http://www.lxe.com/us/products/barcode.aspx?id=1054.

Im, Seunghyun, "Validating Secure Connections between Wireless Devices in Pervasive Computing Using Data Matrix", 2008 International Conference on Multimedia and Ubiquitous Engineering, Retrieved from Internet [Mar. 13, 2009]: http://ieeexplore.ieee.org/stamp/stamp.jsp?arnumber=4505718&isnumber=4505671.

Claycomb, William R. and Shin, Dongwan, "Secure Real World Interaction Using Mobile Devices", May 7, 2006, Retrieved from Internet: http://www.medien.ifi.lmu.de/permid2006/pdf/Claycomb Permid2006.pdf.

Saxena, Nitesh et al., "Secure Device Pairing Based on a Visual Channel", 2006, Retrieved from Internet: http://eprint.iacr.org/2006/050.pdf.

Claycomb, W. and Shin, Dongwan, "Using a Two Dimensional Colorized Barcode Solution for Authentication in Pervasive Computing", IEEE Xplore, 2007 Retrieved from Internet [Mar. 13, 2009]: http://ieeexplore.ieee.org/xpls/abs_all.jsp?tp=&arnumber=1652222&isnumber=34634.

Suri, Pushpa R. and Rani, Sona, "Bluetooth Authentication and Personal Identification Number Estimation by Attacker", Information Technology Journal 6 (6), pp. 938-940, 2007.

Palm, "Bluetooth Pairing: definition and overview", 2009 Palm, Inc.

Bluetooth, "Connecting your Devices" [date unknown].

Managoli, Girish, "Implementing Solid Security on a Bluetooth Product", EE Times—India Sep. 25, 2007.

European Search Report, European Patent Application No. 10 154 856.8, dated Aug. 4, 2010.

"Barcodes in Flash. Dynamically generating UPC barcodes using Actionscript." http://www.codeofpaint.com/?q=node/17.

United States Request for Continued Examination and Amendment for U.S. Appl. No. 12/420,360, dated Feb. 28, 2013.

United States Final Office Action for U.S. Appl. No. 12/420,360, dated Dec. 3, 2012.

Information Disclosure Statements and Notices of References Cited for U.S. Appl. No. 12/420,360.

United States Amendment for U.S. Appl. No. 12/572,386, dated Jul. 3, 2013.

United States Non-Final Office Action for U.S. Appl. No. 12/572,386, dated Apr. 5, 2013.

United States Amendment for U.S. Appl. No. 12/572,386, dated Jan. 25, 2013.

United States Non-Final Office Action for U.S. Appl. No. 12/572,386, dated Oct. 25, 2012.

United States Amendment for U.S. Appl. No. 12/572,386, dated Jun. 12, 2012.

Information Disclosure Statements and Notices of References Cited for U.S. Appl. No. 12/572,386.

(56) References Cited

OTHER PUBLICATIONS

United States Amendment for U.S. Appl. No. 12/420,360, dated Jul. 17, 2012.
United States Amendment for U.S. Appl. No. 12/504,907, dated Jun. 6, 2013.
United States Non-Final Office Action for U.S. Appl. No. 12/504,907, dated Mar. 14, 2013.
United States Request for Continued Examination for U.S. Appl. No. 12/504,907, dated Jan. 8, 2013.
United States Advisory Action for U.S. Appl. No. 12/504,907, dated Dec. 19, 2012.
United States Amendment for U.S. Appl. No. 12/504,907, dated Dec. 7, 2012.
United States Final Office Action for U.S. Appl. No. 12/504,907, dated Oct. 9, 2012.
Information Disclosure Statements and Notices of References Cited for U.S. Appl. No. 12/504,907.
Response for European Patent Application No. 101545856.8, dated Aug. 20, 2014.
Request for Continued Examination (RCE) for U.S. Appl. No. 12/572,386, dated Jun. 12, 2014.
Notice of Allowance for U.S. Appl. No. 12/572,386, dated Jun. 23, 2014.
Shi, Third Office Action for CA2732568, Feb. 2, 2015.
Response. European Application No. 10154856.8. Dated: Oct. 25, 2010.
Office Action. Co-pending U.S. Appl. No. 12/572,386. Dated: Mar. 13, 2012.
Co-pending U.S. Appl. No. 12/420,360, Systems, Devices, and Methods for Displaying a Barcode at a Computing Device, filed Apr. 8, 2009.
Office Action. Co-pending U.S. Appl. No. 12/420,360. Dated: Nov. 7, 2011.
Amendment. Co-pending U.S. Appl. No. 12/420,360. Dated: Feb. 7, 2012.
Office Action. Co-pending U.S. Appl. No. 12/420,360. Dated: Apr. 17, 2012.
Office Action. Co-pending U.S. Appl. No. 12/504,907. Dated: Mar. 20, 2012.
Amendment. Co-pending U.S. Appl. No. 12/504,907. Dated: May 16, 2012.
Hess, First Office Action for U.S. Appl. No. 14/254,409, dated Jun. 25, 2015.

* cited by examiner

METHODS AND DEVICES FOR TRANSMITTING AND RECEIVING DATA USED TO ACTIVATE A DEVICE TO OPERATE WITH A SERVER

FIELD

Embodiments described herein relate generally to the display of a barcode at a computing device, and more specifically to the display of a barcode at a computing device for capture by another computing device.

BACKGROUND

A barcode generally refers to an optical representation of data. For example, a typical "1-dimensional" barcode may be represented by a series of lines of varying widths and spacing. As a further example, a "2-dimensional" barcode may be represented by squares, dots, hexagons or other geometric patterns. A barcode may be a black-and-white barcode. Alternatively, a barcode may be a color barcode.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

DETAILED DESCRIPTION

Some embodiments of the systems and methods described herein make reference to a mobile device. A mobile device may be a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities), for example. A mobile device may communicate with other devices through a network of transceiver stations.

Figure 1:
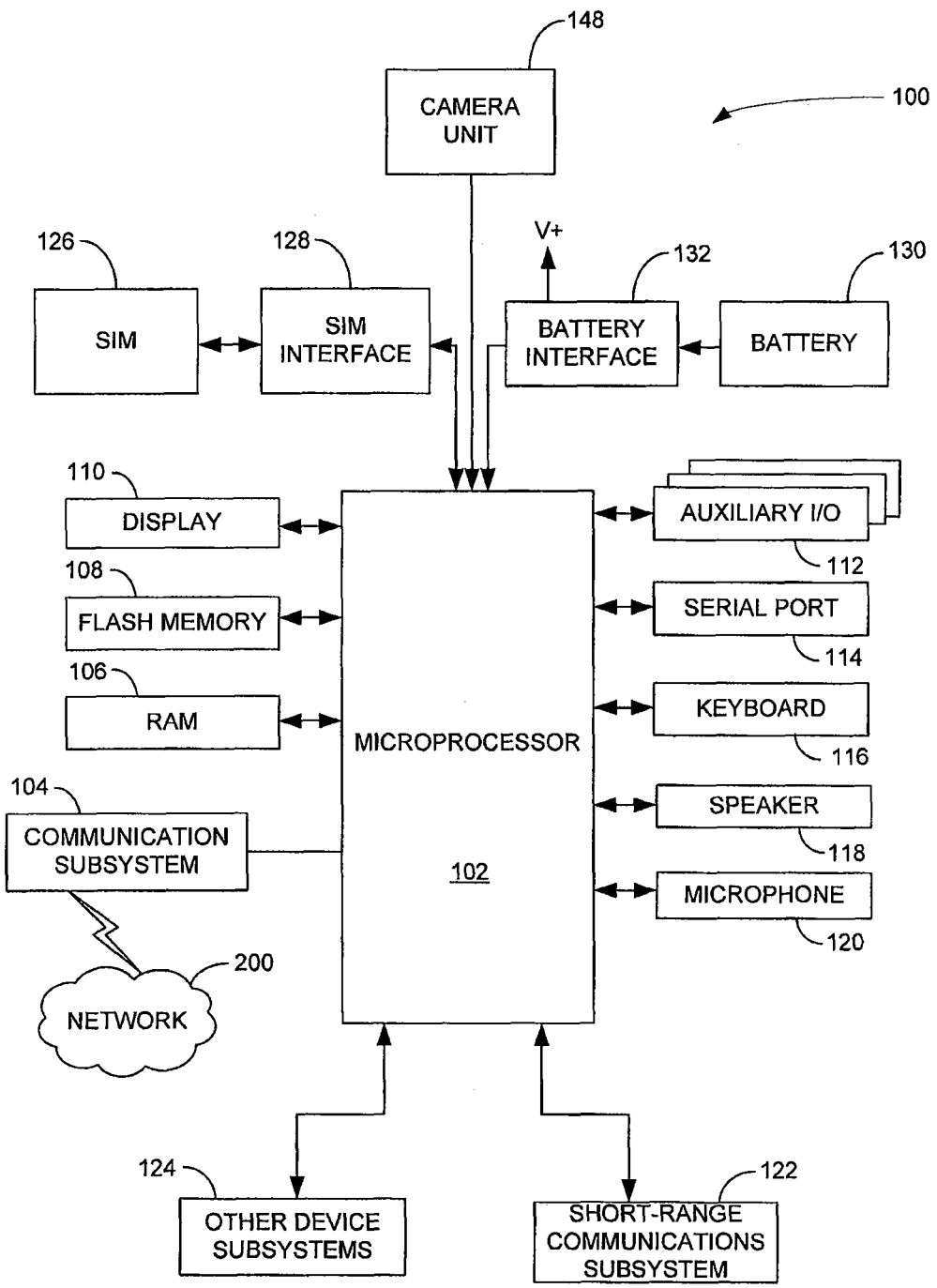
FIG. 1 is a block diagram of a mobile device in one example implementation.
Figure 2:
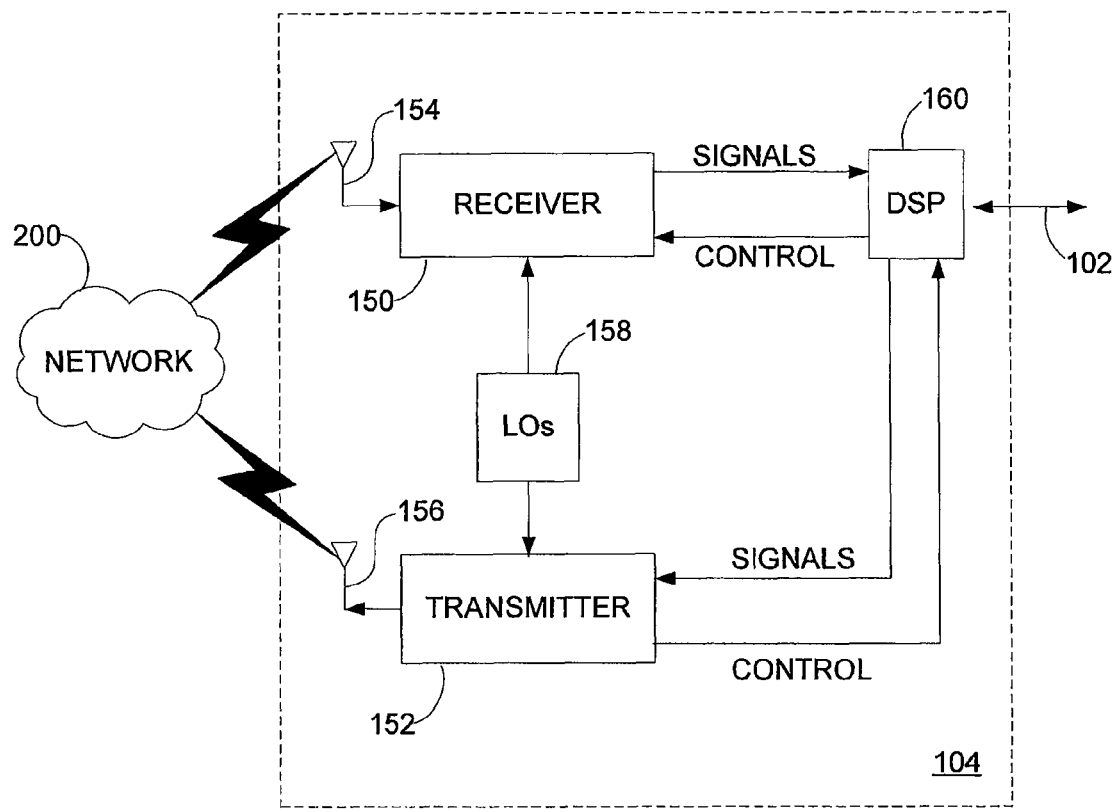
FIG. 2 is a block diagram of a communication subsystem component of the mobile device of FIG. 1.
Figure 3:
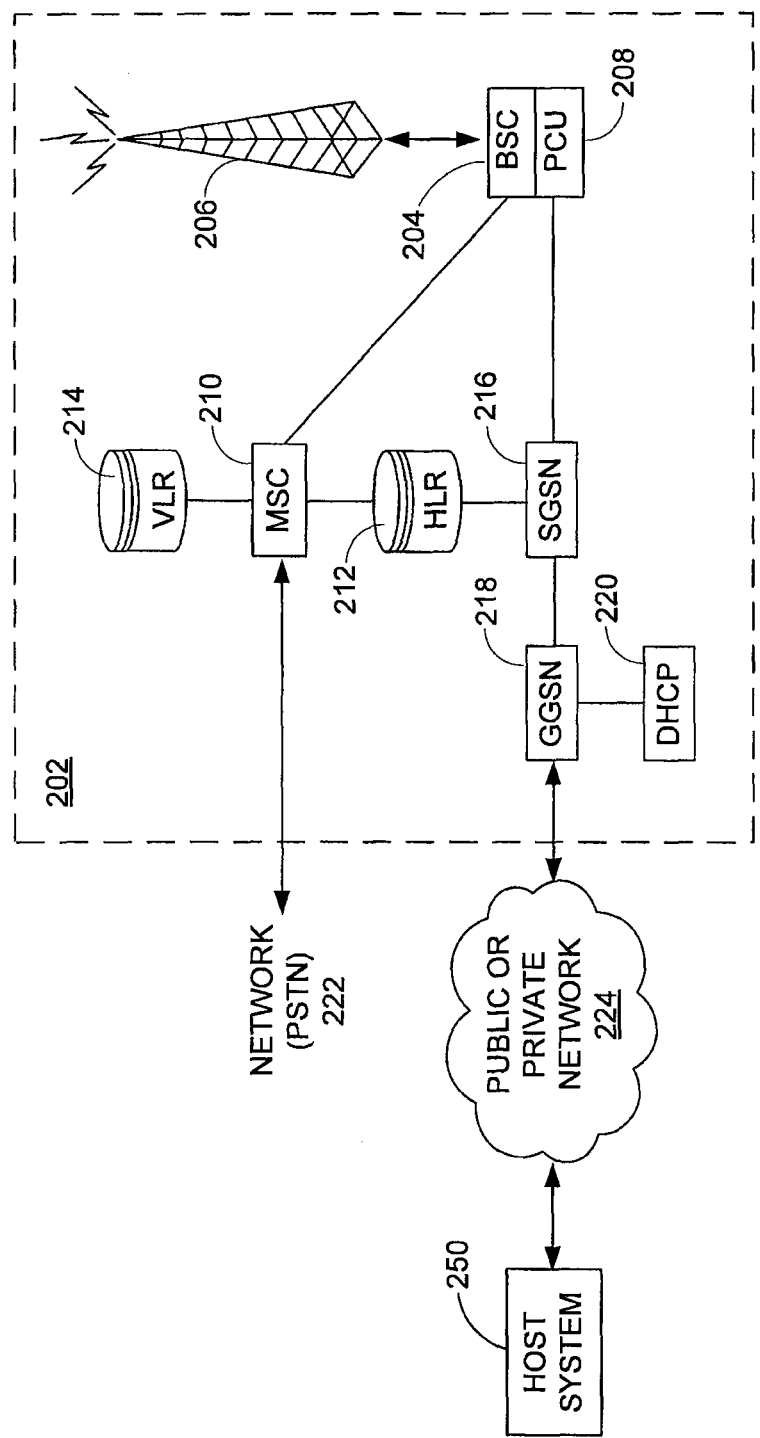
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, may be performed through communication subsystem 104. Communication subsystem 104 may be configured to receive messages from and send messages to a wireless network 200. In one example implementation of mobile device 100, communication subsystem 104 may be configured in accordance with the Global System for Mobile Communication (GSM) and General Packet Radio Services (GPRS) standards. The GSM/GPRS wireless network is used worldwide and it is expected that these standards may be supplemented or superseded eventually by Enhanced Data GSM Environment (EDGE) and Universal Mobile Telecommunications Service (UMTS), and Ultra Mobile Broadband (UMB), etc. New standards are still being defined, but it is believed that they will have similarities to the network behavior described herein, and it will also be understood by persons skilled in the art that the embodiments of the present disclosure are intended to use any other suitable standards that are developed in the future. The wireless link connecting communication subsystem 104 with network 200 may represent one or more different Radio Frequency (RF) channels, operating according to defined protocols specified for GSM/GPRS communications. With newer network protocols, these channels may be capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems. Other network communication technologies that may be employed include, for example, Integrated Digital Enhanced Network (iDEN™), Evolution-Data Optimized (EV-DO), and High Speed Packet Access (HSPA), etc.

Microprocessor 102 may also interact with additional subsystems such as a Random Access Memory (RAM) 106, flash memory 108, display 110, auxiliary input/output (I/O) subsystem 112, serial port 114, keyboard 116, speaker 118, microphone 120, camera unit 148, short-range communications subsystem 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, as well as device-resident functions such as a calculator or task list. Operating system software used by microprocessor 102 is typically stored in a persistent store such as flash memory 108, which may alternatively be a read-only memory (ROM) or similar storage element (not shown). Those skilled in the art will understand that the operating system, specific device applications, or parts thereof, may be temporarily loaded into a volatile store such as RAM 106.

Mobile device 100 may send and receive communication signals over network 200 after network registration or activation procedures have been completed. Network access may be associated with a subscriber or user of a mobile device 100. To identify a subscriber, mobile device 100 may provide for a Subscriber Identity Module ("SIM") card 126 (or e.g. USIM for UMTS, or CSIM or RUIM for CDMA) to be inserted in a SIM interface 128 in order to communicate with a network. SIM 126 may be one example type of a conventional "smart card" used to identify a subscriber of mobile device 100 and to personalize the mobile device 100, among other things. Without SIM 126, mobile device 100 may not be fully operational for communication with network 200. By inserting SIM 126 into SIM interface 128, a subscriber may access all subscribed services. Services may include, without limitation: web browsing and messaging such as e-mail, voice mail, Short Message Service (SMS), and Multimedia Messaging Services (MMS). More advanced services may include, without limitation: point of sale, field service and sales force automation. SIM 126 may include a processor and memory for storing information. Once SIM 126 is inserted in SIM interface 128, it may be coupled to microprocessor 102. In order to identify the subscriber, SIM 126 may contain some user parameters such as an International Mobile Subscriber Identity (IMSI). By using SIM 126, a subscriber may not necessarily be bound by any single physical mobile device. SIM 126 may store additional subscriber information for a mobile device as well, including date book (or calendar) information and recent call information.

Mobile device 100 may be a battery-powered device and may comprise a battery interface 132 for receiving one or more rechargeable batteries 130. Battery interface 132 may be coupled to a regulator (not shown), which assists battery 130 in providing power V+ to mobile device 100. Although current technology makes use of a battery, future technologies such as micro fuel cells may provide power to mobile device 100. In some embodiments, mobile device 100 may be solar-powered.

Microprocessor 102, in addition to its operating system functions, enables execution of software applications on mobile device 100. A set of applications that control basic device operations, including data and voice communication applications, may be installed on mobile device 100 during its manufacture. Another application that may be loaded onto mobile device 100 is a personal information manager (PIM). A PIM may have functionality to organize and manage data items of interest to a subscriber, such as, but not limited to, e-mail, calendar events, voice mails, appointments, and task items. A PIM application may have the ability to send and receive data items via wireless network 200. PIM data items may be seamlessly integrated, synchronized, and updated via wireless network 200 with the mobile device subscriber's corresponding data items stored and/or associated with a host computer system. This functionality may create a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 may enable a subscriber to set preferences through an external device or software application, and extend the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 may provide for communication between mobile device 100 and different systems or devices, without the use of network 200. For example, subsystem 122 may include an infrared device and associated circuits and components for short-range communication. Examples of short-range communication include standards developed by the Infrared Data Association (IrDA), Bluetooth®, and the 802.11 family of standards (Wi-Fi®) developed by IEEE.

In use, a received signal such as a text message, an e-mail message, or web page download may be processed by communication subsystem 104 and input to microprocessor 102. Microprocessor 102 then processes the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary I/O subsystem 112 may include devices such as: a touch screen, mouse, track ball, infrared fingerprint detector, or a roller wheel with dynamic button pressing capability. Keyboard 116 may comprise an alphanumeric keyboard and/or telephone-type keypad, for example. A composed item may be transmitted over network 200 through communication subsystem 104.

For voice communications, the overall operation of mobile device 100 may be substantially similar, except that the received signals may be processed and output to speaker 118, and signals for transmission may be generated by microphone 120. Alternative voice or audio I/O subsystems, such as a voice message recording subsystem, may also be implemented on mobile device 100. Although voice or audio signal output may be accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 may comprise a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 may be dependent upon the network 200 in which mobile device 100 is intended to operate; thus, it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is generally a limited resource, typically due to limits in overall bandwidth and limited battery power of mobile device 100.

When mobile device 100 is fully operational, transmitter 152 may be typically keyed or turned on only when it is sending to network 200 and may otherwise be turned off to conserve resources. Similarly, receiver 150 may be periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with GPRS and GSM technologies; however, in other embodiments, different standards may be implemented as discussed in more detail above. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) server 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 may also contain a Packet Control Unit (PCU) 208 that connects to SGSN 216 to control segmentation, radio channel allocation and to satisfy packet switched requirements. To track mobile device location and availability for both circuit switched and packet switched management, HLR 212 may be shared between MSC 210 and SGSN 216. Access to VLR 214 may be controlled by MSC 210.

Station 206 may be a fixed transceiver station. Station 206 and BSC 204 together may form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile may be stored in HLR 212. HLR 212 may also contain location information for each registered mobile device and can be queried to determine the current location of a mobile device. MSC 210 may be responsible for a group of location areas, and may store the data of the mobile devices currently in its area of responsibility in VLR 214. Further, VLR 214 may also contain information on mobile devices that are visiting other networks. The information in VLR 214 may include part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times while requiring less use of computing resources.

SGSN 216 and GGSN 218 are elements that may be added for GPRS support; namely packet switched data support, within GSM. SGSN 216 and MSC 210 may have similar responsibilities within wireless network 200 by keeping track of the location of each mobile device 100. SGSN 216 also performs security functions and access control for data traffic on network 200. GGSN 218 may provide internetworking connections with external packet switched networks and connect to one or more SGSNs 216 via an Internet Protocol (IP) backbone network operated within the network 200. During normal operations, a given mobile device 100 may perform a "GPRS Attach" to acquire an IP address and to access data services. This normally is not present in circuit switched voice channels as Integrated Services Digital Network (ISDN) addresses may be generally used for routing incoming and outgoing calls. Currently, GPRS capable networks may use private, dynamically assigned IP addresses, using a DHCP server 220 connected to the GGSN 218. There are many mechanisms for dynamic IP assignment, including the use of a combination of a Remote Authentication Dial-In User Service (RADIUS) server and a DHCP server, for example. Once the GPRS Attach is complete, a logical connection may be established from a mobile device 100, through PCU 208, and SGSN 216 to an Access Point Node (APN) within GGSN 218, for example. The APN may represent a logical end of an IP tunnel that can either access direct Internet compatible services or private network connections. The APN may also represent a security mechanism for network 200, insofar as each mobile device 100 is assigned to one or more APNs, and mobile devices 100 cannot generally exchange data without first performing a GPRS Attach to an APN that it has been authorized to use. The APN may be considered to be similar to an Internet domain name such as "myconnection.wireless.com".

Once the GPRS Attach is complete, a tunnel may be created and all traffic exchanged within standard IP packets using any protocol that can be supported in IP packets. This may include tunneling methods such as IP over IP as in the case with some IPSecurity (IPsec) connections used with Virtual Private Networks (VPN). These tunnels are also referred to as Packet Data Protocol (PDP) Contexts and there may be a limited number of these available in the network 200. To maximize use of the PDP Contexts, network 200 will run an idle timer for each PDP Context to determine if there is a lack of activity. When a mobile device 100 is not using its PDP Context, the PDP Context may be deallocated and the IP address returned to the IP address pool managed by DHCP server 220.

Figure 4:
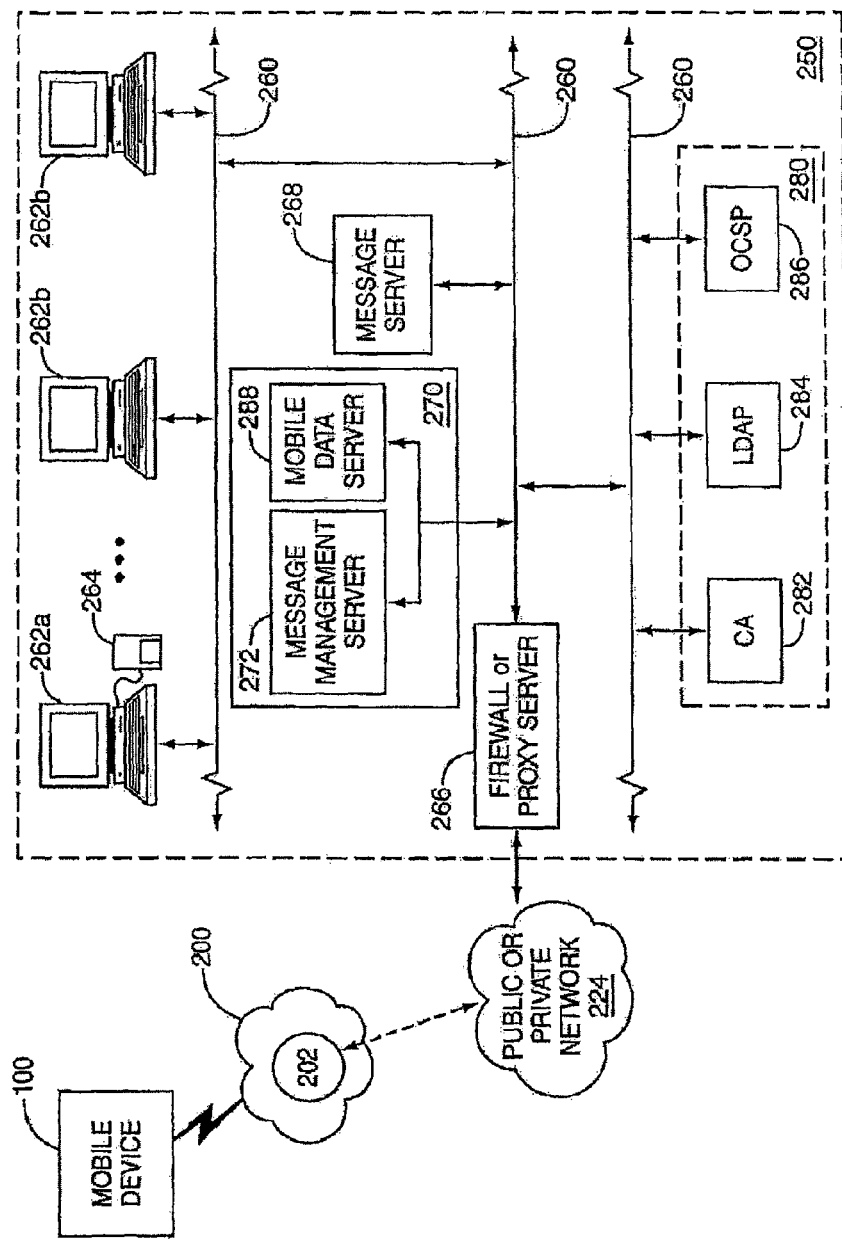
FIG. 4 is a block diagram illustrating components of a host system in one example implementation.

Referring now to FIG. 4, a block diagram illustrating components of a host system in one example configuration is shown. Host system 250 will typically be a corporate office or enterprise or other local area network (LAN), but may instead be a home office computer or some other private system, for example, in variant implementations. In the example illustrated in FIG. 4, host system 250 is depicted as a LAN of an organization to which a user of mobile device 100 belongs.

LAN 250 comprises a number of network components connected to each other by LAN connections 260. For instance, a user's desktop computing device ("desktop computer") 262a with an accompanying cradle 264 for the user's mobile device 100 may be situated on LAN 250. Cradle 264 for mobile device 100 may be coupled to computer 262a by a serial or a Universal Serial Bus (USB) connection, for example. Other user computers 262b may also be situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates, often performed when initializing mobile device 100 for use. The information downloaded to mobile device 100 may include S/MIME certificates or PGP keys used in the exchange of messages, for example.

It will be understood by persons skilled in the art that user computers 262a, 262b will typically be also connected to other peripheral devices not explicitly shown in FIG. 4. Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol may provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection may include, for example, a Transmission Control Protocol (TCP)/IP or User Datagram Protocol (UDP)/IP connection to deliver the messages directly to mobile device 100 in this variant implementation.

Messages intended for a user of mobile device 100 may be initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be configured to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages may then typically be retrieved from message server 268 and stored locally on computer 262a.

When operating mobile device 100, the user may wish to have e-mail messages retrieved for delivery to the mobile device 100. An e-mail client application operating on mobile device 100 may request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, a user address (e.g. an e-mail address identifying the user's account) is associated with mobile device 100, and messages addressed specifically to a user of mobile device 100 may be automatically redirected to mobile device 100 as the message server 268 receives those messages.

To facilitate the wireless communication of messages and message-related data between mobile device 100 and components of LAN 250, a number of wireless communications support components 270 may be provided. In this example implementation, wireless communications support components 270 may comprise a message management server 272, for example. Message management server 272 may be a computing device comprising one or more processors, memory, storage devices and communications interfaces. Message management server 272 may be used to specifically provide support for the management of messages, such as e-mail messages, that are to be handled by mobile devices. Generally, while messages are still stored on message server 268, message management server 272 may be used to control when, if, and how messages should be sent to mobile device 100. Message management server 272 may also facilitate the handling of messages composed on mobile device 100 that are sent to message server 268 for subsequent delivery.

A remote activation or provisioning procedure may be used to configure mobile device 100 to operate with message management server 272 in order to receive messages, for example. This may be done when a user acquires a new mobile device 100, for example. Typically, the activation procedure will require that the user identify himself to the message management server 272, or to some other activation server configured to activate mobile devices. The user may be identified by a user address (e.g. by an e-mail address), for example. The activation procedure may also require that the user identify a unique device address of the mobile device 100 (e.g. the device's identification number ("PIN")) that the user wishes to have activated (e.g. to receive messages associated with his e-mail account), to message management server 272.

If a user switches mobile devices, then the new mobile device will typically need to be re-activated to operate with message management server 272 using the new mobile device, in order to effectively associate the user address (e.g. e-mail address) with the new mobile device (e.g. disassociating the user address with the PIN of the old mobile device, and associating the user address with the PIN of the new mobile device).

The activation procedure attempts to further authenticate that the mobile device 100 to be activated is within the user's control, and verifies that the user and mobile device 100 are authorized to operate with the message management server 272 or other servers coupled thereto (e.g. message server 268). For example, the mobile device 100 may seek authorization to access message stores, send messages, access address book data, and access calendar data associated with the user's account. In some embodiments, completion of the activation procedure may also result in the establishment of cryptographic parameters (e.g. encryption keys) that may be used to secure subsequent communications between the mobile device 100 and the message management server 272.

Message management server 272 may, for example: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 is permitted to receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be configured to provide other control functions, such as only pushing certain message information or pre-defined portions (e.g. "blocks") of a message stored on message server 268 to mobile device 100. For example, when a message is initially retrieved by mobile device 100 from message server 268, message management server 272 is configured to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 may facilitate better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices are supported.

Standard e-mail security protocols typically facilitate secure message transmission between non-mobile computing devices (e.g. computers 262a, 262b of FIG. 4; remote desktop devices). In order that signed messages received from senders may be read from mobile device 100 and that encrypted messages be sent from mobile device 100, mobile device 100 may be configured to store public keys (e.g. in S/MIME certificates, PGP keys) of other individuals. Keys stored on a user's computer 262a may be downloaded from computer 262a to mobile device 100 through cradle 264, for example.

Mobile device 100 may also be configured to store the private key of a public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key may be exchanged between the computer 262a and mobile device 100 so that the user may share one identity and one method for accessing messages.

User computers 262a, 262b can obtain S/MIME certificates and PGP keys from a number of sources, for storage on computers 262a, 262b and/or mobile devices (e.g. mobile device 100) in a key store, for example. The sources of these certificates and keys may be private (e.g. dedicated for use within an organization) or public, may reside locally or remotely, and may be accessible from within an organization's private network or through the Internet, for example. In the example shown in FIG. 4, multiple public key infrastructure (PKI) servers 280 associated with the organization reside on LAN 250. PKI servers 280 may include a CA server 282 that may be used for issuing S/MIME certificates, a Lightweight Directory Access Protocol (LDAP) server 284 that may be used to search for and download S/MIME certificates and/or PGP keys (e.g. for individuals within the organization), and an Online Certificate Status Protocol (OCSP) server 286 that may be used to verify the revocation status of S/MIME certificates, for example.

Certificates and/or PGP keys may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates and PGP keys through a mobile data server 288. Similarly, mobile data server 288 may be configured to allow mobile device 100 to directly query OCSP server 286 to verify the revocation status of S/MIME certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of S/MIME certificates and PGP keys [not shown] may include a Windows certificate or key store, another secure certificate or key store on or outside LAN 250, and smart cards, for example.

A request to activate a mobile device to operate with a server is generally made by a user via the mobile device or another computing device being operated by the user. For example, the user of the mobile device may use a desktop computer on a corporate network to request that the mobile device be activated. In some cases, a laptop computer or tablet computer may be used in place of the desktop computer. The desktop computer or laptop computer or tablet computer may also be referred to herein as a personal computer. Using the desktop computer, for example, the user may follow instructions provided within a user interface by an enterprise activation application to access their message management server or email server, and to activate the mobile device. The mobile device may be physically connected to the desktop computer via cradle or data cable. Alternatively, the user may activate the mobile device using an enterprise activation application that executes and resides on the mobile device. In either case, the enterprise activation application may send a request to activate the mobile device to the server, when directed to do so by a user via a user interface.

When a request to activate a mobile device to operate with a server is received by the server, the request will typically identify the user who seeks to have his (e.g. e-mail) account associated with that mobile device, so that the user may subsequently receive messages on that mobile device, for example. However, before the mobile device is to be activated to operate with the server, an administrator that oversees the operation of the server may want to ensure that the user has, in fact, authorized the request. For example, an attacker might have sent a request from his own mobile device, but identified some other user in the request. An administrator would want to ensure that the account of the other user would not be improperly associated with the attacker's mobile device. Accordingly, the administrator may seek a way to ensure that a user identified in a request has, in fact, authorized the request.

In this regard, in some known systems, the administrator will initially provide an activation password directly to a user who wishes to activate a mobile device to operate with the server, by phone or in person. At the server side, the administrator associates an (e.g. email) account of the user with the activation password. Subsequently, in order for a mobile device to be activated in response to a request, the requestor (typically the user) must prove to the server that he or she has knowledge of this activation password. This can better ensure that a user identified in the request has authorized the request.

For example, some time after the user is provided with the activation password, the user can initiate an enterprise activation application on his mobile device. The user will typically be required to input a user (e.g. email) address associated with an (e.g. email) account as identification, and the activation password, via a user interface. It may also be necessary for the user to also supply a network address of a particular server (e.g. of the message management server) or some other routing information to enable the mobile device to communicate with the appropriate server. The enterprise activation application can then initiate activation of the mobile device process by sending a device activation request to the server.

When the server receives the device activation request from the mobile device, the server requires that authentication acts be performed, in which the user must prove knowledge of the activation password. In theory, the activation password might simply be transmitted from the mobile device to the server in order to prove that the user has knowledge of the activation password. However, the transmission would then typically require access to a pre-established secure channel in order to avoid interception of the activation password by an attacker. Such a secure channel may not always be available or convenient to establish.

In an implementation that does not require that a secure communication channel to be pre-established, a cryptographic protocol may be employed that provides for mutual authentication where two parties are in possession of a shared secret (e.g. the activation password in this case), but that does not require that the shared secret itself be transmitted between the parties. One such protocol is the Simple Password Exponential Key Exchange (SPEKE) protocol. The SPEKE protocol may be used in certain applications that require generation of a shared encryption key, but the protocol operates in a manner that implicitly authenticates the parties in the protocol. In other words, at the end of a SPEKE exchange, two parties will ultimately arrive at the same encryption key if and only if they both have knowledge of the correct shared secret.

If the authentication performed is successful, the administrator can feel fairly confident that the device activation request was initiated by, or at the direction of, the same user to whom the administrator initially provided the activation password. In other words, the administrator may safely assume that a third party is not pretending to be the user who is requesting activation of a mobile device if the administrator is certain that the activation password was received by the proper user authorized to activate the mobile device, and not by a third party. Upon successful authentication, the mobile device is then activated to operate with the server, and the activation process concludes. It should be noted that as part of the activation process, the mobile device might also establish a symmetric encryption key (e.g. a shared encryption key generated using the SPEKE protocol) with the server, so that any subsequent communications with the server may be encrypted using the established key.

In view of the foregoing, it is advantageous for an administrator to ensure that the activation password is received by the proper user from the outset, in a manner that would not allow the activation password to be readily intercepted by a third party. In this regard, as previously noted, an administrator will typically initially communicate an activation password to a user either by telephone or in person, to better maintain confidentiality of the activation password. The activation password to be communicated to the user may have been automatically generated by a message management server, or manually specified by the administrator, for example.

From the perspective of a user having received the activation password in this manner, the process of activating a mobile device is generally not automated. For example, the user is typically required to take steps to initiate execution of an enterprise activation application, and then manually enter an e-mail address and the activation password (e.g. received over the telephone or in person from the system administrator) at the mobile device when prompted to do so.

In situations where the activation password is typed into a mobile device or other computing device by the user, there is a trade-off between convenience and security. Shorter passwords may be easier to communicate to a user over the telephone or in person, and for the user to type in manually into a device, particularly a mobile device. Mobile devices typically provide smaller keys on a keyboard or keypad, whether they be physical keys or virtual keys displayed on a touch screen. However, in order to ensure better security, longer, more complex passwords that, for example, include mixed case and non-alphanumeric symbols may be used.

Unfortunately, managing such passwords may be difficult. For example, a complex password may be more difficult for a user to receive via telephone, and communicating a complex password in this manner may increase the risk of transcription errors. It may also be more difficult for a user to accurately enter the complex password on a device such as a mobile device.

In accordance with at least some embodiments described herein, activation data, including an activation password for example, is encoded in a barcode. This may permit more secure passwords to be utilized, while providing increased user convenience.

Barcodes generally comprise optical, machine-readable representations of data. Barcodes are commonly provided as images printed on physical media, to be subsequently read using a scanning device that is configured to capture the images for further processing (e.g. by appropriate software and/or hardware coupled to the scanning device). In the course of further processing, the data represented by the barcode is decoded.

The form of data representation used in a barcode is commonly called the symbology. A barcode symbology may represent data in the width and spacing of parallel lines, in which case the barcode may be referred to as a one-dimensional (1D) barcode. Examples of 1D barcode symbologies may include Universal Product Code (UPC), Codabar, European Article Number (EAN), and the like. Other barcode symbologies may employ two-dimensional (2D) patterns of squares, dots or other geometric patterns to represent data. Examples of common 2D barcode symbologies may include Datamatrix, Maxicode, Quick Response (QR) Code, Aztec Code, Semacode, and the like.

In implementations of at least one embodiment described herein, a barcode is generated by a server (e.g., message management server 272 of FIG. 4) and sent to a computing device to be displayed as an image on a display of the computing device (e.g. desktop computer 262a or 262b of FIG. 4). The image may be subsequently captured using a camera or other hardware component associated with a mobile device (e.g. a mobile device similar to mobile device 100 of FIG. 1). Further processing is subsequently performed at the mobile device (e.g. by appropriate software and/or hardware), so that the data represented by the barcode can be decoded. Accordingly, the barcode provides a medium for the transmission of data from the server to the mobile device, via the computing device. Generally, a user will have user access to both the computing device and the mobile device. User authentication may or may not be required in order for the user to gain access to the computing device and/or the mobile device.

Depending on the desired application, different types of data may be transmitted from the server to the mobile device. In accordance with at least one embodiment described herein, barcodes may be used to facilitate the secure transmittal of security parameters (e.g. a shared secret or password) from the server to the mobile device.

In a broad aspect, disclosed herein is an activation barcode that encodes activation data. The activation data may comprise an activation password. The activation data may optionally also comprise other data, such as a user address (e.g. an e-mail address). A device equipped with a barcode scanner and the appropriate software and/or hardware can then capture the activation barcode and decode the barcode to recover the activation data. The device can then automatically perform certain acts in the initiation of the activation procedure, without requiring user intervention, and may relieve users of the need to transcribe or remember, for example, the activation password and user address.

Accordingly, the activation password may be generated or selected to be longer and/or more complex, and therefore the passwords used may generally provide enhanced security. For example, such passwords may comprise mixed-case alphabetic characters, numerals and non-alphanumeric symbols. As the activation password is encoded in a barcode image, it may also be more difficult for automated password retrieval processes to surreptitiously obtain the activation password when the activation password is sent electronically via a network, for example, since such automated password retrieval processes may be less likely to easily decipher images.

Additionally, a barcode-based activation process may be performed remotely, without requiring direct, personal contact with or active participation of an administrator. It may also no longer be necessary to ensure that the administrator make immediate contact with a user before the administrator can provide the user with an activation password.

Embodiments described herein are generally directed to methods and devices that may permit mobile devices to be activated by communicating activation data to users using an activation barcode. In some embodiments, the activation barcode may be e-mailed to a user, or sent using some other messaging scheme (e.g. instant messaging), for display on a computing device (e.g. a desktop computer).

In other embodiments, the user may visit a web page using a browser application on a computing device. A system administrator may publish the web page on a web server within an enterprise network. The web server on which the web page is hosted may be accessible outside the enterprise network through a firewall. The web server may require the user to perform a successful network authentication, that is, to authenticate to the enterprise network using the user's network credentials (e.g., account password on a corporate network) before granting the user access to the web page, so that the user may view the activation barcode on the web page. When the activation barcode is displayed on a display of the computing device, the user may cause the mobile device to scan or capture the barcode, using a camera associated with the mobile device, for example. The activation barcode may be processed at the mobile device to obtain activation data, for use in initiating a request to activate the mobile device to operate with a server.

In variant embodiments, the user may print the activation barcode (e.g., on a piece of paper) using a printer, for later scanning by the mobile device. This may increase user convenience where, for example, the user is not presently in possession of the mobile device to be activated, or where the user may not have immediate access to a desktop computer.

In one broad aspect, there is provided a method of activating a mobile device to operate with a server, the method performed by a processor of the mobile device, the method comprising: receiving a barcode from the server by reading an image comprising the barcode via a computing device, wherein the image is displayed on a display associated with the computing device, and wherein the barcode encodes activation data comprising an activation password; decoding the barcode to obtain the activation data; transmitting a device activation request to the server; and exchanging data with the server to perform an authentication using the activation password, in accordance with an authentication protocol; wherein the mobile device is activated to operate with the server if the authentication is successful.

In another broad aspect, said receiving comprises capturing the image using a camera associated with the mobile device.

In another broad aspect, said decoding comprises processing the image to identify the barcode.

In another broad aspect, the barcode further encodes activation initiation data, and the method further comprises: determining that the barcode encodes activation initiation data; and automatically initiating said transmitting if the barcode encodes the activation initiation data.

In another broad aspect, the barcode further encodes activation initiation data, and the method further comprises: determining that the barcode encodes activation initiation data; prompting for user confirmation that the device activation request is to be transmitted; receiving the user confirmation; and initiating said transmitting in response to receiving the user confirmation.

In another broad aspect, the activation data further comprises a user address.

In another broad aspect, the user address comprises an e-mail address.

In another broad aspect, there is provided a mobile device comprising a processor, a memory, and a communication interface, wherein the processor is configured to: receive a barcode from a server by reading an image comprising the barcode via a computing device, wherein the image is displayed on a display associated with the computing device, and wherein the barcode encodes activation data comprising an activation password; decode the barcode to obtain the activation data; transmit a device activation request to the server; and exchange data with the server to perform an authentication using the activation password, in accordance with an authentication protocol; wherein the mobile device is activated to operate with the server if the authentication is successful.

In another broad aspect, there is provided a computer-readable storage medium upon which a plurality of computer-readable instructions for execution by a processor of a mobile device is stored, wherein execution of the instructions causes the processor to: receive a barcode from a server by reading an image comprising the barcode via a computing device, wherein the image is displayed on a display associated with the computing device, and wherein the barcode encodes activation data comprising an activation password; decode the barcode to obtain the activation data; transmit a device activation request to the server; and exchange data with the server to perform an authentication using the activation password, in accordance with an authentication protocol; wherein the mobile device is activated to operate with the server if the authentication is successful.

In another broad aspect, there is provided a method of activating a mobile device to operate with a server, the method performed by a processor of the server, the method comprising: generating an image comprising a barcode, wherein the barcode encodes activation data comprising an activation password; transmitting the image to a computing device for display on a display associated with the computing device; receiving a device activation request from the mobile device; exchanging data with the mobile device to perform an authentication using the activation password, in accordance with an authentication protocol; and activating the mobile device to operate with the server if the authentication is successful.

In another broad aspect, the method performed by the processor of the server further comprises, prior to said generating, receiving an activation password request from the mobile device.

In another broad aspect, the barcode further encodes activation initiation data that identifies, to the mobile device, that the barcode encodes the activation data.

In another broad aspect, the activation data further comprises a user address.

In another broad aspect, the user address comprises an e-mail address.

In another broad aspect, said transmitting comprises transmitting the image to the computing device via an e-mail transmission.

In another broad aspect, said transmitting comprises transmitting the image to the computing device via a web page accessible at the computing device.

In another broad aspect, the web page is accessible at the computing device upon a successful network authentication at the computing device.

In another broad aspect; the computing device comprises a personal computer.

In another broad aspect, there is provided a server comprising a processor, a memory, and a communication interface, wherein the server is configured to activate a mobile device to operate with the server, wherein the processor is configured to: generate an image comprising a barcode, wherein the barcode encodes activation data comprising an activation password; transmit the image to a computing device for display on a display associated with the computing device; receive a device activation request from the mobile device; exchange data with the mobile device to perform an authentication using the activation password, in accordance with an authentication protocol; and activate the mobile device to operate with the server if the authentication is successful.

In another broad aspect, there is provided a computer-readable storage medium upon which a plurality of computer-readable instructions for execution by a processor of a server is stored, wherein execution of the instructions causes the processor to: generate an image comprising a barcode, wherein the barcode encodes activation data comprising an activation password; transmit the image to a computing device for display on a display associated with the computing device; receive a device activation request from the mobile device; exchange data with the mobile device to perform an authentication using the activation password, in accordance with an authentication protocol; and activate the mobile device to operate with the server if the authentication is successful.

These and other aspects and features of various embodiments will be described in greater detail below.

Figure 5:
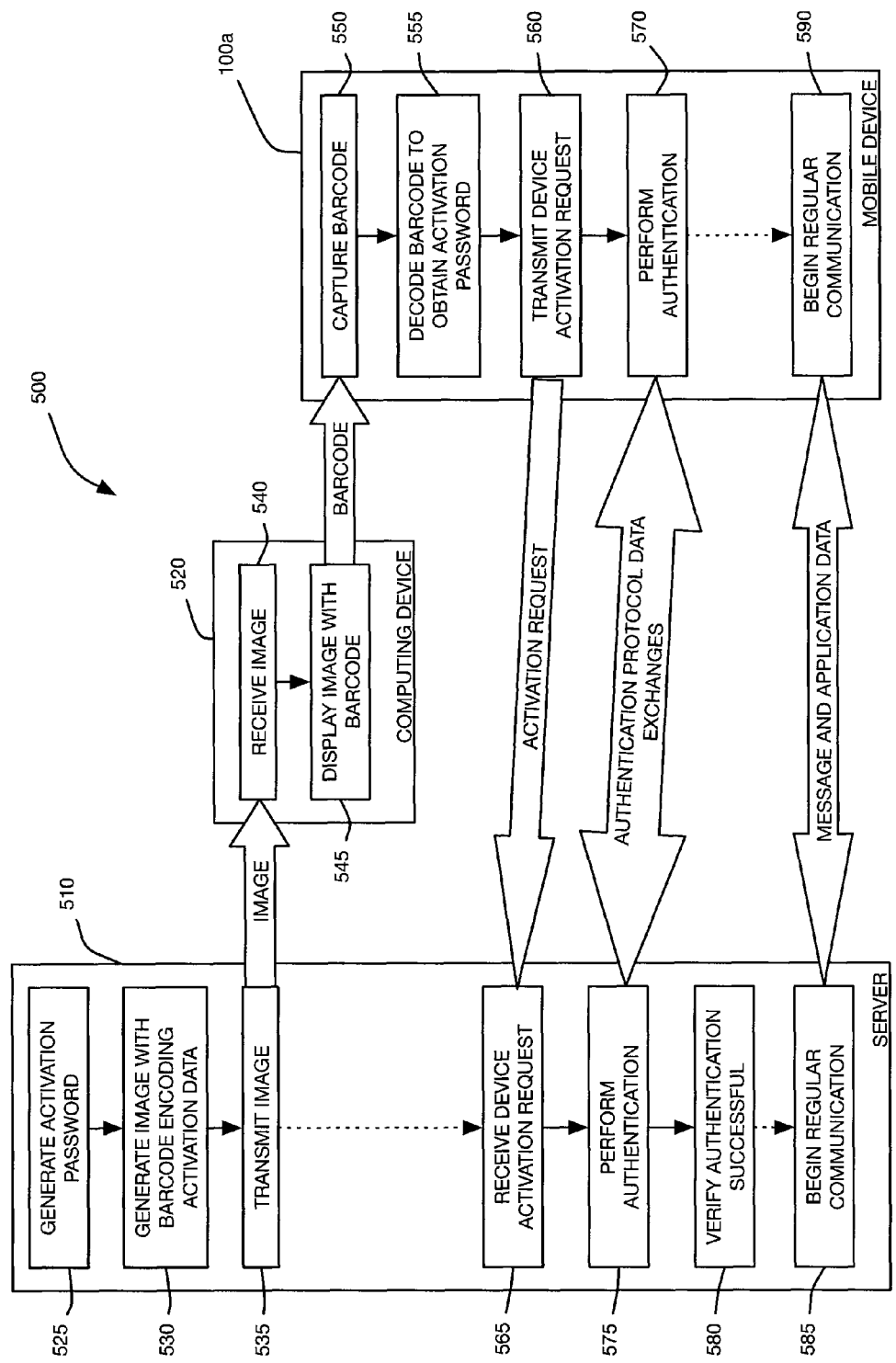
FIG. 5 is a flowchart illustrating acts of a method of activating a mobile device, in accordance with at least one embodiment.

Reference is first made to FIG. 5, in which a flowchart illustrating acts of a method of activating a mobile device is shown generally as 500, in accordance with at least one embodiment.

In at least one embodiment, acts 525, 530, 535, 565, 575, 580 and 585 of method 500 are performed by a processor executing an application (e.g. comprising one or more application modules) residing on a server 510, such as message management server 272 of FIG. 4, or some other activation server, which may or may not be physically or logically separate from message management server 272. In variant embodiments, the application may reside on a computing device other than a server.

At 525, an activation password is generated by server 510 for activating mobile device 100a to operate with server 510. In one embodiment, the password is composed of characters selected at random from a set of allowed password characters, although it may be generated by some other technique in variant embodiments. The password may be generated so that it contains at least as many characters as a minimum number specified by an administrative policy. The password may also be generated so that it contains at least one character from each of one or more sets of character classes, such as lower-case alphabetic characters, upper-case alphabetic characters, numeric characters, or symbols.

In contrast to known systems where the activation password would typically be communicated to a user by telephone or in person, at 530, server 510 encodes activation data for transmission to mobile device 100a, in an activation barcode. Server 510 then generates an image comprising the activation barcode. The activation data comprises the activation password, and optionally, may comprise additional data such as a user address (e.g. an e-mail address) or other user identifier.

The activation data may comprise a network address (e.g. IP address) associated with an activation server (e.g. server 510 or some other activation server) that mobile device 100a is to contact in order to activate the mobile device 100a. Alternatively or additionally, the activation data may comprise an e-mail address associated with an account that server 510 is monitoring for messages originating from mobile device 100a. This e-mail address may be used to assist in the routing of messages originating from mobile device 100a, and may or may not be the same as the user address (which may also be an e-mail address) that the server 510 expects to associate with mobile device 100a upon completion of the activation process.

In the example embodiments described herein, the activation server that is to activate the mobile device 100a is the same server that generates the image comprising the activation barcode. However, in variant embodiments, the activation server that is to activate the mobile device 100a may be different from the server that generates the image comprising the activation barcode.

Figure 8:
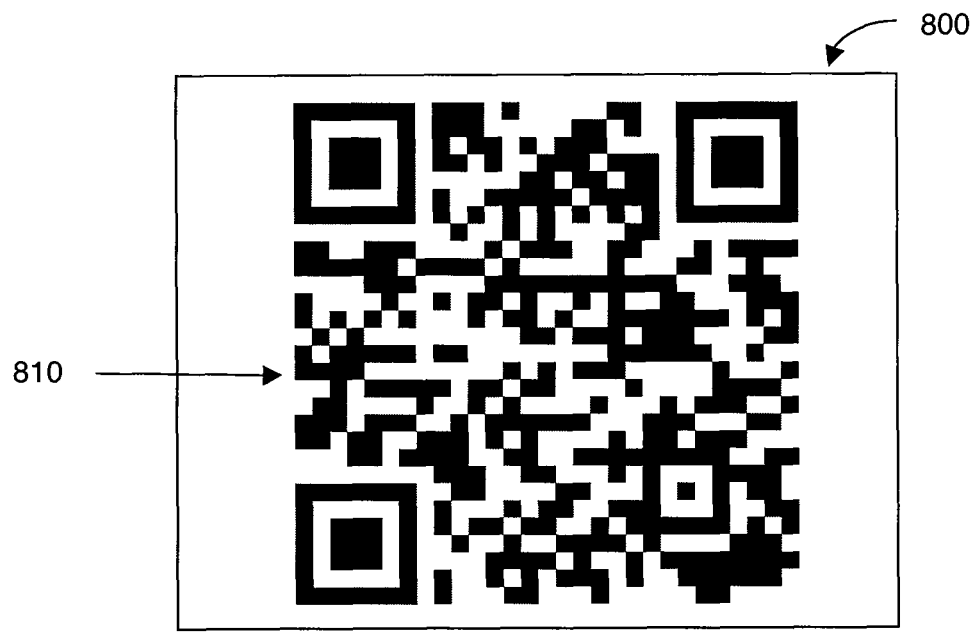
FIG. 8 is an example screen capture of the display of a computing device as it displays a barcode for transmission to one other computing device in one example implementation.

In at least one embodiment, the activation barcode comprises a 2-dimensional barcode represented by squares, dots, and/or other geometric patterns (see e.g. barcode 810 of FIG. 8). However, in variant embodiments, a different type of barcode may be generated at 530.

In at least some embodiments, the generated image is in a raster image format, such as Graphics Interchange Format (GIF), Portable Network Graphics (PNG), Joint Photographic Experts Group (JPEG) or Tagged Image File Format TIFF. However, in variant embodiments, the generated image may be in a scalable vector format, such as Scalable Vector Graphics (SVG). In variant embodiments, other image formats may be employed. For example, any format that can be subsequently used for display may be employed, including any proprietary format that is used to represent image data.

In at least one embodiment, the activation barcode comprises a black-and-white barcode. For illustrative purposes, examples are described herein where the activation barcode is a black-and-white barcode. However, activation barcodes employing different color combinations may be generated in variant embodiments.

In some embodiments, the generation of the activation password at 525 and the activation barcode at 530 may be initiated based on administrator user input provided via a user interface at the server 510. For example, the administrator of server 510 may be presented with a dialog box prompting him or her to generate the activation password and the activation barcode, to be delivered to an appropriately configured computing device (e.g., computing device 520). In variant embodiments, the generation of the activation password and the activation barcode may be triggered based on some other event, such as the time that has elapsed since the last successful activation, or a request from the user to be provided with a new activation barcode, for example.

At 535, the image comprising the activation barcode generated at 530 is transmitted to computing device 520, in a format suitable for display on a display associated with the computing device. In at least some embodiments, the image is transmitted via e-mail sent to a user authorized to activate a mobile device, such as mobile device 100a, and the image is displayed when the e-mail is displayed by a messaging application, such as Microsoft Outlook, for example. Security of the e-mail may be enhanced by encrypting the e-mail message, and privacy may be enhanced by sending the e-mail to an e-mail address accessible only to the authorized user, or by ensuring the e-mail is only sent within an organization's network. Accordingly, such measures may help to avoid accidental reception by a different user, or malicious interception by third parties outside the organization. In a variant embodiment, the image may be transmitted via instant messaging to the user, with the image being displayed by an instant messaging client on the computing device.

In this embodiment, the activation barcode is transmitted, via e-mail message for example, to the computing device 520 and not to mobile device 100a directly, as the mobile device 100a is not yet activated to receive any such messages from server 510.

In at least one other embodiment, the image is transmitted by generating a web page comprising the image. The web page may be published on a web server (e.g., on a corporate network). The web page may be made accessible to an authorized user via computing device 520 following a successful network authentication of the user. For example, users may authenticate themselves to the network using network credentials (e.g., account password on the corporate network), and upon successful network authentication, a user is provided access to the web page and thus the activation barcode.

In the examples provided herein, an image comprising the activation barcode is generated at the server and transmitted to the computing device 520 for display. However, the image being transmitted need not necessarily be in the form of an image file that has been pre-generated at the server. For example, in a variant embodiment, "raw" barcode data (e.g. in a binary or other representation) may be generated at the server and transmitted to the computing device, such that the barcode might be considered to be generated in a form suitable for display only when the barcode data is further processed at the computing device 520.

Subsequently, after the activation data encoded in the activation barcode has been received at mobile device 100a, at 565, server 510 receives a device activation request from mobile device 100a over a network, such as network 224. The device activation request may comprise a user address (e.g. an e-mail address) that the user is seeking to associate with mobile device 100a and the device identifier (e.g. PIN) of mobile device 100a.

In some embodiments, the device activation request may be in the form of a message sent by the mobile device 100a to server 510 that will appear to the server as an e-mail message being sent to an e-mail address previously provided by server 510 as routing information. The format of the message identifies the message specifically as being a device activation request. Server 510 is configured to monitor the mailbox associated with the corresponding e-mail account, so that when an e-mail message in this particular format arrives, server 510 is configured to detect its receipt and proceed with further acts in the activation process.

At 575, server 510 proceeds with the activation process by performing acts in an authentication, in which server 510 must verify that the requestor (e.g. the user of mobile device 100a) has knowledge of the activation password generated at 525. In at least one embodiment, the authentication that is performed is a mutual authentication, in that the server 510 also proves to the device that server 510 has knowledge of the same activation password.

In at least one embodiment, the activation password is used as a shared secret for a known cryptographic protocol, such as SPEKE, for example. Other authentication protocols based on the use of a shared secret may be employed in variant embodiments. The protocol will use the activation password to perform the mutual authentication, in known manner. The protocol will generally involve numerous data exchanges before a determination of whether the authentication is successful can be made. The protocol also provides for key confirmation acts, to confirm that the various data items exchanged between server 510 and mobile device 100a were not modified in transit.

The data exchanges may take place over a communication network (e.g. network 224), which may comprise a wireless network. In one embodiment, where the PIN of mobile device 100a has been provided to server 510 in the device activation request, the data exchanges that take place in the authentication may be performed over a PIN channel or other communication channel established between server 510 and mobile device 100a.

At 580, server 510 verifies that the authentication performed at 575 is successful, and if so, server 510 may then activate the mobile device 100a to operate with server 510, where server 510 typically creates an association between the user address (e.g. the user's e-mail address) with the mobile device network identifier (e.g. the device identifier such as the PIN of the mobile device 100a), and then stores a record of the association in a database.

Upon successful authentication, at 585, server 510 may begin regular communication with mobile device 100a. Server 510 may then, for example, send and receive message and application data to and from mobile device 100a. For example, e-mail messages delivered to the user's e-mail address can subsequently be pushed out to mobile device 100a over a wireless network, using the mobile device network identifier to assist in the routing of messages. Server 510 may also be configured to synchronize other user data stored on server 510 or on some other server with mobile device 100a, such as address book data and/or calendar data, for example.

In at least one embodiment, communications between server 510 and mobile device 100a may be secured using a symmetric encryption key that was generated in the course of the authentication performed at 575, where SPEKE was the protocol used, for example. During the authentication process, server 510 and mobile device 100a may also exchange long-term public keys. These long-term public keys can later be used to establish a new symmetric encryption key without requiring a further exchange of a shared secret or password. Other pre-stored encryption keys may be used to secure communications between server 510 and mobile device 100a at 585, in variant embodiments.

Referring now to device 520, in at least one embodiment, acts 540 and 545 are performed by a processor executing an application (e.g., comprising one or more application modules) residing on the computing device 520 (e.g. desktop computer 262a, 262b of FIG. 4, a laptop computer or other personal computer). In variant embodiments, the application may reside on a device that comprises a display, other than a computing device.

Computing device 520 need not reside within the network comprising server 510. For example, computing device 520 may be located remotely from the network (e.g., a computer on the public Internet).

At 540, computing device 520 receives an image comprising the activation barcode from server 510, as transmitted by server 510 at 535. The image may be received via e-mail, an instant message, or a web page retrieved by a web browser application, for example.

Following receipt of the image, computing device 520 may display the image comprising the activation barcode at 545, on a display associated with computing device 520 for example, as part of an e-mail message being read in a messaging application, as part of an instant message being read in an instant messaging application, or in a web page being displayed by a web browser application. The display associated with computing device 520 may be a display built into the computing device 520 itself, or it may be a physically separate display device operatively coupled to the computing device 520. Activating the mobile device by allowing the activation data, such as the activation password, to be communicated to the user through his computing device may increase user convenience. This may also provide an easy way for an administrator to communicate the activation data to the user, as the administrator can communicate the activation password with a certain level of security without the need for the user to be immediately available to receive the activation password.

By displaying the generated barcode at a display associated with the computing device, information represented in the barcode may then be transmitted to another computing device, such as mobile device 100a. For example, the mobile device may capture the barcode via a camera or other optical sensing device associated with the mobile device. Allowing a user to use the camera to scan the barcode containing certain information may increase user convenience, as compared to systems that would require the user to input that information into the mobile device 100a using a keyboard or keypad.

Referring now to mobile device 100a, in at least one embodiment, acts 550, 555, 560, 570 and 590 are performed by a processor executing an application (e.g., comprising one or more application modules) residing on the mobile device 100a, such as mobile device 100 of FIG. 1. In variant embodiments, the application may reside on a computing device other than a mobile device.

In at least some embodiments, the mobile device has an enterprise activation application stored in its memory. A user may launch the enterprise activation application, which may subsequently direct the user to scan an activation barcode (e.g., using a camera associated with the mobile device, e.g. camera unit 148 of FIG. 1) specifically for initiating the activation process.

At 550, mobile device 100a captures the image comprising the activation barcode and extracts the activation barcode. In at least some embodiments, the image is captured via a camera (e.g. camera unit 148 of FIG. 1) or other optical sensing device associated with mobile device 100a. In this respect, the camera or other optical sensing device may be built into the mobile device itself, or it may be a physically separate device operatively coupled to the mobile device. The camera or other optical sensing device is configured to provide captured data to the processor of the mobile device, for example, in order to extract the barcode and then decode the data represented in the barcode. Extraction of the barcode may require processing the captured image to isolate the barcode by removing image noise and artifacts, surrounding background data, and performing other image processing, such as de-skewing, as will be known to those skilled in the art.

As previously noted, the activation barcode may also encode other data, such as a user address (e.g. an e-mail address) or other user identifier, and/or a network address for server 510 or other activation server (e.g., IP address) or other routing information.

At 555, mobile device 100a decodes the activation barcode to obtain the activation password, and any other activation data that is needed to assist in the activation of mobile device 100a to operate with server 510.

At 560, mobile device 100a transmits a device activation request to server 510. The device activation request may comprise a user address and/or a mobile device network identifier such as a PIN or other device identifier. In one embodiment, if the user address was encoded in the activation barcode for example, mobile device 100a may be configured to automatically forward the user address to the server if required by the server, without user intervention, at 560. The device identifier (e.g. PIN) may also be sent in the device activation request without requiring the user to enter it at mobile device 100a. This may increase user convenience, as the user need not enter one or more of these addresses manually.

The device activation request is transmitted to server 510 over a network, such as network 224, using the network address encoded in the activation barcode or other routing information encoded in the barcode that allows mobile device 100a to make contact the server (e.g. an e-mail address of an account being monitored by server 510) and present the device activation request.

At 570, mobile device 100a communicates with server 510 in performing acts in an authentication, in which knowledge of the activation password initially generated at server 510 is proven.

As previously noted, the activation password may be used as a shared secret for a known cryptographic protocol, such as SPEKE, for example. Other authentication protocols based on the use of a shared secret may be employed in variant embodiments. The protocol will use the activation password to perform the authentication, in known manner. The protocol will generally involve numerous data exchanges before a determination of whether the authentication is successful can be made. The protocol also provides for key confirmation acts, to confirm that the various data items exchanged between server 510 and mobile device 100a were not modified in transit.

The data exchanges may take place over a communication network (e.g. network 224), which may comprise a wireless network. In one embodiment, where the PIN of mobile device 100a has been provided to server 510 in the device activation request, the data exchanges that take place in the authentication may be performed over a PIN channel or other communication channel established between server 510 and mobile device 100a.

At 590, following verification and authentication by the server 510, mobile device 100a begins regular communication with server 510, as previously described herein. For example, mobile device 100a may send and receive message and application data to and from server 510, or perform other functions as previously described herein.

Figure 6:
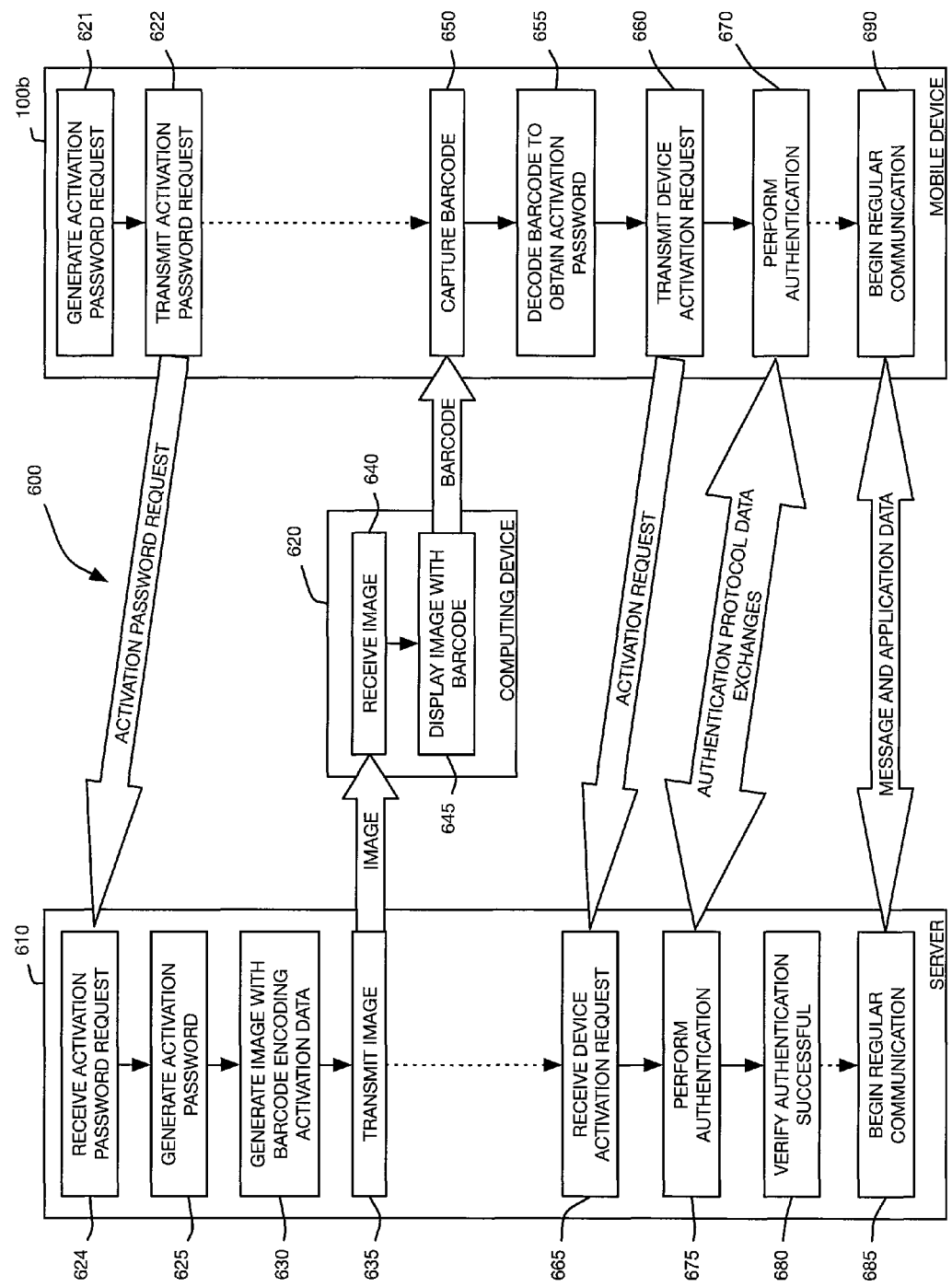
FIG. 6 is a flowchart illustrating acts of a method of activating a mobile device, in accordance with at least one other embodiment.

In accordance with at least one other embodiment, FIG. 6 illustrates acts of a method 600 that are generally analogous to the acts of method 500 of FIG. 5. In particular, acts such as 625 to 690 of method 600 are generally analogous to corresponding acts 525 to 590 of method 500, and the reader is directed to the foregoing description in respect of FIG. 5 for further details of the acts illustrated in FIG. 6. Likewise, server 610 is analogous to server 510, computing device 620 is analogous to computing device 520 and mobile device 100b is analogous to mobile device 100a. However, in method 600, the activation process is initiated at 621 by a user input requesting an activation password, provided via a user interface.

At 621, mobile device 100b generates an activation password request in response to user input, and at 622, mobile device 100b transmits the activation password request to the server. For example, the user may send a text message or an instant message to an administrator to request an activation password, access a web page from a browser, or request an activation message via phone. In variant embodiments, the activation password request may be made by a user at a different device other than mobile device 100b, such as the user's computing device (e.g. computing device 620), or some other user's mobile or computing device (not shown).

At 624, server 610 receives the activation password request via the network and proceeds to generate the activation password at 625 and perform subsequent acts, as previously described in respect of the analogous acts of FIG. 5.

Figure 7:
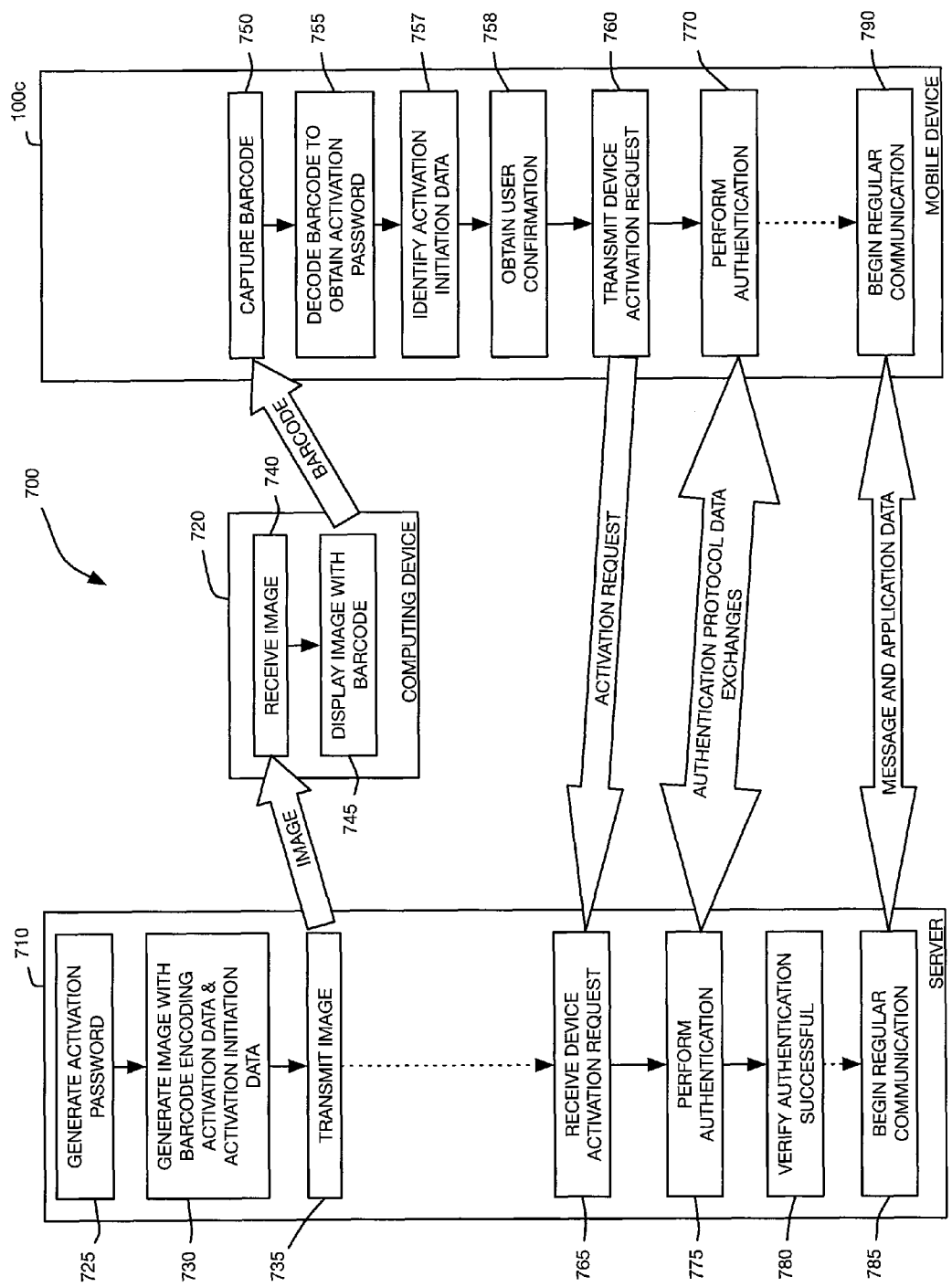
FIG. 7 is a flowchart illustrating acts of a method of activating a mobile device, in accordance with at least one other embodiment.

In accordance with at least one other embodiment, FIG. 7 illustrates acts of a method 700 that are generally analogous to the acts of method 500 of FIG. 5. In particular, acts such as 725, 735 to 745 and 760 to 790 of method 700 are generally analogous to corresponding acts 525, 535 to 545 and 560 to 590 of method 500, and the reader is directed to the foregoing description in respect of FIG. 5 for further details of the acts illustrated in FIG. 7. Likewise, server 710 is analogous to server 510, computing device 720 is analogous to computing device 520 and mobile device 100c is analogous to mobile device 100a. However, in method 700, the generated activation barcode comprises additional data usable by mobile device 100c to automatically initiate a device activation request.

Although not explicitly shown in the Figures, it will be understood that the features described with reference to FIG. 6 may also be implemented in combination with features of the embodiments described with reference to FIG. 7.

As previously noted, a mobile device may have an enterprise activation application stored in its memory in some embodiments. A user may launch the application, which may provide an option, in a user interface of the mobile device, for the user to scan (e.g., using a camera associated with the device) a barcode that encodes activation data received from a server. The user may choose to use this application when the user expects that a barcode being displayed encodes activation data.

However, there may be situations in which a user (e.g. of mobile device 100c) may encounter a barcode, but it may not be readily discernible to the user upon visual inspection of the barcode that the barcode comprises activation data.

Some devices may be equipped with a general-purpose barcode scanning application stored in its memory. The general-purpose barcode scanning application may be used to scan (e.g., using a camera associated with the device) a variety of barcodes with different purposes. For example, the device may be configured to scan a barcode on a book, enabling the device to perform an ISBN lookup and provide the user opportunity to purchase a similar book. Alternatively, the device may scan a barcode on an inventory item as part of a cataloging process. Other applications are possible.

Some other devices may be equipped with a camera application stored in its memory for capturing video or still images (e.g., using a camera associated with the device). The camera application may allow a device to be configured to detect when a particular captured image comprises a barcode.

In accordance with at least one embodiment, activation initiation data may also be encoded in the barcode transmitted at 735. The activation initiation data may identify that one or more specific types of data is encoded within the barcode, for example, data that is used to activate a mobile device to operate with a server. Put another way, the activation initiation data may facilitate identification of at least one primary task that is to be performed using other data encoded within the barcode, before the other data is processed. This may allow the device to take appropriate actions before processing the other data encoded within the barcode, such as automatically launching an enterprise activation application where the enterprise activation application has not yet been launched by a user. This may further increase user convenience.

For example, a user's device may scan a barcode, but the user may not be initially aware or certain that the barcode specifically contains data that is to be used to activate a mobile device to operate with a server. If the barcode contains activation initiation data and is scanned by the user's device (e.g. executing a general-purpose barcode scanning application or a camera application), the activation initiation data may permit the device to automatically identify that that the barcode comprises activation data, and to automatically process the activation data accordingly, treating the scan of the barcode as an act to initiate a device activation request.

Accordingly, act 730 differs from acts 630 and 530 in that server 710 generates an image comprising an activation barcode that encodes activation initiation data in addition to the activation data. Activation initiation data may comprise an identifier that identifies the barcode, which when scanned, can be used to automatically initiate a device activation request.

For example, one, two or three (or more) alphanumeric characters may be encoded in the barcode to represent different types of requests. This may allow an appropriately configured device to automatically infer the type of request encoded in the barcode depending on the characters. A predefined identifier may be used as activation initiation data to indicate that the barcode encodes activation data. Accordingly, further processing steps to activate a mobile device to operate with a server can be automatically initiated by a device that has captured and decoded the barcode, potentially without user intervention once the barcode is read at the mobile device.

At 735, server 710 transmits the image comprising an activation barcode, wherein the activation barcode comprises activation initiation data and activation data.

At the second device 100c, at 750, the image comprising the activation barcode is captured. In at least some embodiments, the barcode may be captured during execution of an enterprise activation application. However, in other embodiments, the activation barcode is captured during execution of a general-purpose barcode scanning application. In still other embodiments, the activation barcode is captured during execution of a camera application.

At 755, mobile device 100c decodes the activation barcode comprising at least the activation password and the activation initiation data.

At 757, mobile device 100c determines whether the activation barcode encodes activation initiation data, indicating that the activation initiation data identifies the barcode as comprising activation data. In embodiments where the barcode image was not captured during execution of an enterprise activation application, mobile device 100c may determine that the activation barcode encodes activation initiation data, and automatically initiate execution of an enterprise activation application.

Optionally, mobile device 100c may obtain user confirmation, at 758, before continuing with the activation process. This may be performed to ensure that the user wishes to proceed with the device activation request, and may be helpful particularly in situations where the user may not have initially been aware that the barcode being scanned comprises activation data. Such confirmation may be obtained, for example, where the barcode contains activation data, but where the barcode was not captured during execution of an enterprise activation application, to avoid inadvertently initiating a device activation request.

User confirmation may be obtained by, for example, generating a user interface prompt after the barcode is scanned (e.g. "Activation of your device with XYZ Co. server is being requested, proceed?"), and receiving user input confirming that the device activation request should be transmitted to the server.

If user confirmation to proceed is obtained, a device activation request may be transmitted to server 710, at 760. The remainder of the activation process may proceed as described with reference to earlier Figures. Otherwise, the method 700 may terminate at device 100c at 758.

Although at least some of the embodiments described herein contemplate the capture of a barcode at a computing device (e.g. a mobile device), in variant embodiments, the barcode may be captured at a device other than a computing device.

Some of the acts of a method of displaying a barcode in accordance with an embodiment described herein may be provided as software instructions stored on computer-readable media and executable by a processor. Examples of computer-readable storage media may include a hard disk, a floppy disk, an optical disk (e.g. a compact disk, a digital video disk), a flash drive or flash memory, magnetic tape, and memory. Other configurations are possible as well.

In variant implementations, some of the acts of a method of displaying a barcode in accordance with an embodiment described herein may be provided as executable software instructions stored in transmission media.

A number of embodiments have been described herein. However, it will be understood by persons skilled in the art that other variants and modifications may be made without departing from the scope of the embodiments as defined in the claims appended hereto.

The invention claimed is:

1. A method of activating a mobile device to operate with a server to send and receive, via the server, electronic mail messages associated with an electronic mail account managed by the server, the method performed by a processor of the mobile device, the method comprising:
   receiving a barcode from the server by reading an image comprising the barcode via a computing device located remotely from the server, wherein the image is displayed on a display associated with the computing device located remotely from the server, and wherein the barcode encodes activation data comprising an activation password;
   decoding the barcode to obtain the activation data;
   transmitting a device activation request to the server; and
   exchanging data with the server to perform an authentication using the activation password, in accordance with an authentication protocol, wherein the exchanging is not via the computing device;

wherein the mobile device is activated to operate with the server to send and receive, via the server, electronic mail messages associated with an electronic mail account managed by the server if the authentication is successful.

2. The method of claim 1, wherein said receiving comprises capturing the image using a camera associated with the mobile device.

3. The method of claim 1, wherein said decoding comprises processing the image to identify the barcode.

4. The method of claim 1, wherein the barcode further encodes activation initiation data, and wherein the method further comprises:
   determining that the barcode encodes activation initiation data; and
   automatically initiating said transmitting upon determining that the barcode encodes the activation initiation data.

5. The method of claim 1, wherein the barcode further encodes activation initiation data, and wherein the method further comprises:
   determining that the barcode encodes activation initiation data;
   prompting for user confirmation that the device activation request is to be transmitted;
   receiving the user confirmation; and
   initiating said transmitting in response to receiving the user confirmation.

6. The method of claim 1, wherein the activation data further comprises a user address.

7. The method of claim 6, wherein the user address comprises an e-mail address.

8. A mobile device comprising a processor, a memory, and a communication interface, wherein the processor is configured to:
   receive a barcode from a server by reading an image comprising the barcode via a computing device located remotely from the server, wherein the image is displayed on a display associated with the computing device located remotely from the server, and wherein the barcode encodes activation data comprising an activation password;
   decode the barcode to obtain the activation data;
   transmit a device activation request to the server; and
   exchange data with the server to perform an authentication using the activation password, in accordance with an authentication protocol, wherein the exchange of data is not via the computing device;
   wherein the mobile device is activated to operate with the server to send and receive, via the server, electronic mail messages associated with an electronic mail account managed by the server if the authentication is successful.

9. A computer-readable storage medium upon which a plurality of computer-readable instructions for execution by a processor of a mobile device is stored, wherein execution of the instructions causes the processor to:
   receive a barcode from a server by reading an image comprising the barcode via a computing device located remotely from the server, wherein the image is displayed on a display associated with the computing device located remotely from the server, and wherein the barcode encodes activation data comprising an activation password;
   decode the barcode to obtain the activation data;
   transmit a device activation request to the server; and
   exchange data with the server to perform an authentication using the activation password, in accordance with an authentication protocol, wherein the exchange of data is not via the computing device;
   wherein the mobile device is activated to operate with the server to send and receive, via the server, electronic mail messages associated with an electronic mail account managed by the server if the authentication is successful.

10. A method of activating a mobile device to operate with a server to send and receive, via the server, electronic mail messages associated with an electronic mail account managed by the server, the method performed by a processor of the server, the method comprising:
    generating an image comprising a barcode, wherein the barcode encodes activation data comprising an activation password;
    transmitting the image to a computing device located remotely from the server for display on a display associated with the computing device located remotely from the server;
    receiving a device activation request from the mobile device;
    exchanging data with the mobile device to perform an authentication using the activation password, in accordance with an authentication protocol, wherein the exchanging is not via the computing device; and
    activating the mobile device to operate with the server to send and receive, via the server, electronic mail messages associated with an electronic mail account managed by the server if the authentication is successful.

11. The method of claim 10, further comprising, prior to said generating, receiving an activation password request from the mobile device.

12. The method of claim 10, wherein the barcode further encodes activation initiation data that identifies, to the mobile device, that the barcode encodes the activation data.

13. The method of claim 10, wherein the activation data further comprises a user address.

14. The method of claim 13, wherein the user address comprises an e-mail address.

15. The method of claim 10, wherein said transmitting comprises transmitting the image to the computing device located remotely from the server via an e-mail transmission.

16. The method of claim 10, wherein said transmitting comprises transmitting the image to the computing device located remotely from the server via a web page accessible at the computing device located remotely from the server.

17. The method of claim 16, wherein the web page is accessible at the computing device located remotely from the server upon a successful network authentication at the computing device located remotely from the server.

18. The method of claim 10, wherein the computing device located remotely from the server comprises a personal computer.

19. A server comprising a processor, a memory, and a communication interface, wherein the server is configured to activate a mobile device to operate with the server to send and receive, via the server, electronic mail messages associated with an electronic mail account managed by the server, wherein the processor is configured to:
    generate an image comprising a barcode, wherein the barcode encodes activation data comprising an activation password;
    transmit the image to a computing device located remotely from the server for display on a display associated with the computing device located remotely from the server;
    receive a device activation request from the mobile device;
    exchange data with the mobile device to perform an authentication using the activation password, in accordance with an authentication protocol, wherein the exchange of data is not via the computing device; and activate the mobile device to operate with the server to send and receive, via the server, electronic mail messages associated with an electronic mail account managed by the server if the authentication is successful.

20. A computer-readable storage medium upon which a plurality of computer-readable instructions for execution by a processor of a server is stored, wherein execution of the instructions causes the processor to:

generate an image comprising a barcode, wherein the barcode encodes activation data comprising an activation password;

transmit the image to a computing device located remotely from the server for display on a display associated with the computing device located remotely from the server;

receive a device activation request from the mobile device;

exchange data with the mobile device to perform an authentication using the activation password, in accordance with an authentication protocol, wherein the exchange of data is not via the computing device; and activate the mobile device to operate with the server to send and receive, via the server, electronic mail messages associated with an electronic mail account managed by the server if the authentication is successful.

* * * * *